3,445,442
HIGH MOLECULAR WEIGHT POLY(4-METHYL-
1-PENTENE) FIBER
Harold M. Spurlin and Winfred E. Weldy, Wilmington,
Del., assignors to Hercules Incorporated, Wilmington,
Del., a corporation of Delaware
No Drawing. Filed June 17, 1964, Ser. No. 375,928
Int. Cl. C08f 3/02, 47/12
U.S. Cl. 260—93.7                                    1 Claim This invention relates to a new fiber and more particularly to an oriented fiber of high molecular weight poly(4-methyl-1-pentene), which fiber exhibits high temperature strength retention and good abrasion resistance.

It is well known that 4-methyl-1-pentene can be polymerized to a high molecular weight crystalline polymer having a melting point above about 230° C. However, when the high molecular weight polymers are spun, as in a melt spinning process, degradation of the polymer is so severe because of the high temperature required to avoid melt fracture, that the resultant fiber has a greatly reduced molecular weight, and the fiber is weak, with poor high temperature strength and very poor abrasion resistance. In fact, as pointed out in U.S. 2,842,532, in order to spin a fiber capable of orientation, it is necessary to reduce the molecular weight of the polymer to a point such that the inherent viscosity is within the range of 0.8 to 1.6. The necessity of using a low molecular weight polymer is even further emphasized by U.S. 2,957,225, where it is set forth that the molecular weight of the polymer must be such that it has a melt index within the range of 0.1 and 44 for the polymer to be within the limits of the spinning process. Thus, the prior art teaches that only a relatively low molecular weight poly(4-methyl-1-pentene) can be melt spun into an orientable fiber and, even then, there is severe degradation of the polymer. As a result, the fibers previously produced from poly(4-methyl-1-pentene) have exhibited only low strength retention at elevated temperatures and poor abrasion resistance.

Solution spinning of a high molecular weight poly(4-methyl-1-pentene) has likewise met with frustration because such processes require long periods of holding the solution at high temperature for degassing, with the result that the fiber spun therefrom has a greatly reduced molecular weight. Hence, attempts to solution spin a high molecular weight polymer results in the production of only a low molecular weight fiber since the solutions of such polymers cannot be degassed at a temperature below about 190° C. due to their high viscosity, and rapid degradation of the polymer takes place. Accordingly, it has previously been possible to spin only low molecular weight polymers by solution spinning processes.

Now, in accordance with this invention, fibers of poly(4-methyl-1-pentene), having a reduced specific viscosity greater than about 5, have been produced, which fibers, on orientation, have exceptional physical properties not exhibited by the low molecular weight poly(4-methyl-1-pentene). Specifically, at 100° C. they retain at least about 50% of their ambient strength properties. In addiiton, they exhibit a vastly improved abrasion resistance over that of the prior art low molecular weight fibers. Because of their high temperature strength retention, they can, for example, be used as reinforcing fibers in tires, for use in fabric for dust bags used in high temperature applications, and in other uses where the fiber is exposed to high temperatures. The many-fold improvement in abrasion resistance enables the use of these fibers for blending with cotton to improve the abrasion resistance of the cotton.

The new high molecular weight poly(4-methyl-1-pentene) fibers of this invention are prepared by spinning a poly(4-methyl-1-pentene) having a molecular weight such that the RSV of the fiber is greater than about 5. Such polymers can be prepared by any of the well known processes for polymerizing 4-methyl-1-pentene. Generally, the polymerization process is carried out by contacting 4-methyl-1-pentene with a transition metal compound—alkylaluminum catalyst in an inert organic liquid diluent under relatively mild conditions of temperature and pressure. After treatment to remove or inactivate the catalyst residues, the polymer, which is insoluble in the diluent at room temperature, is separated by filtration, centrifugation, or other convenient means, and the filter cake so obtained can be used directly in the spinning operation as described below, or the polymer can be dried and then spun by one of the spinning operations described below.

In order to produce the high molecular weight fibers of poly(4-methyl-1-pentene) of this invention, it is necessary to carry out the spinning of a high molecular weight polymer in such a fashion that excessive degradation of the polymer does not occur during the spinning operation. This can be accomplished only by avoiding the high temperatures required for melt spinning and the long hold-up times at elevated temperatures required in normal solution spinning operations. It has been found that such a process can be achieved by spinning a high solids solution of the polymer in a screw extruder fitted with a suitable spinhead and passing the extruded filaments through a solvent spinning-type chimney to remove the solvent from the fiber. One means of carrying out such a process is to charge a solvent wet filter cake of the polymer, such as that obtained directly from the polymerization process or obtained by wetting the dried polymer, to the screw extruder. The filter cake so used must contain at least about 40% of an inert liquid diluent and not more than about 60% of said diluent. If the amount of diluent in the filter cake is less than about 40%, then a much higher spinning temperature is required, e.g., 285° C. or above, to avoid melt fracture of the fibers, with the result that the polymer is severely degraded. On the other hand, if the amount of diluent is greater than about 60%, there is separation of the polymer from the diluent and hence a non-uniform feed, which results in poor spinning continuity. The spinning operation is then carried out at a temperature of from about 200° C. to about 285° C. While the mixture of polymer and diluent as charged to the extruder is not in the form of a solution, the polymer dissolves in the diluent on being heated in the extruder to the spinning temperature.

Another method of preparing the high molecular weight fibers of poly(4-methyl-1-pentene) of this invention is to charge the polymer to the screw extruder in the form of a gel. Suitable gels can be prepared by mixing the dry polymer with the diluent in the weight ratio of from about 20:80 to about 60:40 and then heating the mixture up to a temperation of about 185° C. for about one hour and then cooling the solution so obtained to form a gel of the polymer in the diluent. By following this procedure of charging the polymer in the form of a gel to the screw extruder, the actual solution spun can be somehat more dilute than in the above described spinning process and yet the long holding period at elevated temperature necessary for degassing in ordinary solution spinning is avoided. Depending on the concentration of the gel that is spun, the extrusion temperature in this process can be as low as about 160° C. up to about 285° C.

Any inert liquid organic diluent can be used as the diluent in the above described spinning operations. Particularly suitable are hydrocarbon and chlorinated hydrocarbon diluents. Such hydrocarbons can be aliphatic, alicyclic or aromatic, saturated or unsaturated. Generally there will be used as diluent the commercially available mixtures of such hydrocarbons or chlorinated hydrocarbons. While the polymer is not appreciably soluble in such diluents at room temperature, solvation occurs when the mixture is heated in the extruder. Preferably the diluent will have a boiling point within the range of from about 175° C. to about 300° C.

As pointed out above, after extrusion of the filament, the solvent is removed. This can be done by any of the standard procedures used in dry spinning. For example, it can be passed through a typical solvent spinning-type chimney or by any other means of contacting the filament with a stream (generally countercurrent) of heated gas, as for example, air; nitrogen, carbon dioxide, or steam, to remove the solvent.

Following the solvent removal from the filament, it can be wound on a bobbin and then later subjected to the standard stretching procedures for orienting a fiber or the orientation can, of course, be carried out immediately. The stretching or orientation is carried out at elevated temperature, generally at a temperautre within the range of from about 100° C. to about 200° C. The degree of stretching will, as is well recognized by those skilled in the art, depend upon such interrelated factors as RSV of the fiber, concentration of the solution as spun, the spinning temperature, the size of the spinning orifice, the rate of spinning, the rate of solvent removal, the amount of draw down, the final denier of the fiber desired, and the physical properties desired in the final fiber, i.e. tenacity, modulus and elongation. In general, the filament will be drawn from about 250% to about 1300%. Obviously, many other fiber treatments can be applied, if desired, following the extrusion of the fiber, as for example, sizing of the fiber, dyeing, etc., and these steps of orientation, etc. can be carried out in any desired order after the extrusion of the filament and removal of the solvent therefrom.

By utilizing the above described spinning procedures, no degassing operation is required and the spinning solution is held at the elevated temperature for only the brief period needed in the extruder to raise it to the spinning temperature, with the result that polymer degradation is greatly minimized. Thus it is possible to produce high molecular weight low denier fibers without appreciable polymer degradation or melt fracture. In addition, the fibers so obtained are round rather than flattened, resulting in greatly improved physical properties such as abrasion resistance.

The following examples will illustrate the preparation of the high molecular weight poly(4-methyl-1-pentane) fibers of this invention. All parts and percentages are by weight unless otherwise stated. The molecular weight of the polymers and fibers is shown by the reduced specific viscosity (RSV) given for each. By the term "Reduced Specific Viscosity" is meant the $\eta_{sp/c}$ determined on a 0.1% solution of the polymer in decahydronaphthalene at 135° C.

A typical polymerization of 4-methyl-1-pentene was carried out as follows:

A polymerization vessel with a nitrogen atmosphere was charged with 170 pounds of a dry commercial mixture of chiefly aliphatic hydrocarbons having a boiling point range of 175–200° C., and after heating to 55° C., 1.3 lbs. of a 25% solution of diethylaluminum chloride in the same diluent was added, the mixture was agitated for 30 minutes at 55° C. and then 600 millimoles of a titanium catalyst was added. The titanium catalyst was prepared by adding at 0° C. one mole of titanium tetrachloride to an amount of a 25% solution of ethylaluminum sesquichloride, in the above hydrocarbon diluent, equal to 0.6 mole of diethylaluminum chloride and 0.6 mole of ethylaluminum dichloride. This mixture was held at 0° C. for 16 hours, then heated at 100° C. for 4 hours and filtered. The precipitate was washed three times with the hydrocarbon diluent and then diluted to 0.5 molar in titanium with the hydrocarbon and used in the polymerization reaction. With the temperature in the polymerization held at 55° C., 22 lbs. of 4-methyl-1-pentane was added and at intervals of 5–10 minutes, additional 4-methyl-1-pentene was added in increments of 5 lbs. until a total of 45 lbs. had been added. The polymerization was continued at 55° C. for a total of 6 hrs., after which it was shortstopped by adding 2 liters of butanol. The polymer slurry was heated to 80° C. and a mixture of 20 gals. of water, 4 lbs. sodium hydroxide and 1.6 lbs. of 50% gluconic acid was added and the whole was agitated for 1 hr. at 80° C. The aqueous phase was separated, the polymer slurry agitated at 80° C. for 1 hr. with 20 gals. of water and again the aqueous phase was separated. The polymer slurry was then filtered, reslurried with 20 gals. of heptane at 70° C. for 30 minutes and again filtered. The filter cake was pressed as free of heptane as possible and part was retained as such and part was stabilized and dried at 40° C. under vacuum for 16 hrs. The poly(4-methyl-1-pentene) so produced had an RSV of 7.7.

EXAMPLE 1

The poly(4-methyl-1-pentene) used in this example was prepared as described above and had an RSV of 7.7. A wet cake was prepared from the dry polymer by mixing it with a mixture of aliphatic hydrocarbons having a boiling range of 210–230° C. This solvent wet polymer mixture containing 42% of the polymer was extruded into yarn at 215° C. through a die having eight holes which were 14 mils in diameter. The yarn was passed downward through a stream of nitrogen at 200° C. to remove the solvent and was collected on a bobbin. It was drawn at a draw ratio of 5.25:1 through an oven heated 220° C. and taken up on a bobbin at 126 ft. per minute. The physical properties of the yarn so obtained were measured at 25° C. and 100° C. and are tabulated below. The tenacity in grams per denier was measured on an Instrom at an extension rate of 100% per minute at 25° C.

|  | 25° C. | 100° C. |
|---|---|---|
| Tenacity, g.p.d. | 3.3 | 1.8 |
| Elongation, percent | 24 | 24 |
| Modulus, g.p.d. | 14 | 7.6 |
| RVS of yarn | 6.2 | |
| Ratio tenacity at 100° C. to tenacity at 25° C. | 0.55 | |

EXAMPLE 2

A filter cake of poly(4-methyl-1-pentene), having an RSV of 7.7 and prepared as described above, was used in this example. The filter cake contained about 58% by weight of a mixture of aliphatic hydrocarbons having a boiling range of 210–235° C. This solvent wet filter cake was fed to a 1-inch screw extruder feeding a fiber spinhead containing a geared metering pump and a 35-hole spinneret with a screen pack. Using extruder temperatures ranging from 210° C. to 248° C. (at the head), fiber was extruded from the spinneret, passed through a drying chimney, and taken up on a yarn bobbin. It was then drawn at a ratio of 6:1. The yarn so obtained had an RSV of 6.5, a tenacity of 3.9 g.p.d., with a strength retention at 100° C. of 57% that at room temperature and had good abrasion resistance (greater than 2500 cycles on a Stoll abrader).

EXAMPLE 3

A filter cake of poly(4-methyl-1-pentene) which contained 50% by weight of a mixture of aliphatic hydrocarbons having a boiling range of 260–288° C. was extruded and spun into a 2905/35 yarn in the equipment described in Example 2. The spinning operation was carried out at 275° C. The RSV of the polymer prior to spinning was 7.7, and after spinning the RSV of the fiber was 5.5. It was oriented by drawing at a ratio of 6.25:1. The fiber so obtained had a strength retention at 100° C. of 50% that at room temperature and had good abrasion resistance.

EXAMPLE 4

Poly(4-methyl-1-pentene) having an RSV of 4.2 was melt spun at 300° C. into an 1850/35 yarn. The RSV of the fiber so obtained was 1.8. After drawing at a ratio of 4.5:1, the yarn had the following properties.

Tenacity, g.p.d., at—
 25° C. _____ 4.2
 100° C. _____ 0.92
  Abrasion resistance (cycles on Stoll abrader) _ 50

As may be seen from the foregoing examples, the poly (4-methyl-1-pentene) fiber of this invention, having an RSV greater than 5, has vastly improved properties and, consequently, greater utility over the poly(4-methyl-1-pentene) fibers of the prior art. Having high temperature strength retention, they can be ironed without sticking and are useful in a wide variety of high temperature applications. In addition, their greatly improved abrasion resistance makes them useful in the manufacture of fabric blends, as for example, blends with cotton, wool, silk, etc.

What we claim and desire to protect by Letters Patent is:
1. An oriented fiber of poly(4-methyl-1-pentene) having a reduced specific viscosity of from about 5 to about 6.5 as measured on a 0.1% solution in decahydronaphthalene at 135° C., said fiber retaining at 100° C. at least about 50% of its strength at room temperature, said fiber having a uniform denier and having been oriented by stretching from 250 to 1300%.

References Cited

UNITED STATES PATENTS 2,842,532  7/1958  Campbell _____ 260—94.9
2,957,225  10/1960  Welch _____ 260—94.9

OTHER REFERENCES

Schmidt and Marlies: Principles of High Polymer Theory and Practice, New York, 1948, p. 364.

J. K. Stille: Introduction to Polymer Chemistry, New York, 1962, p. 25.

JAMES A. SEIDLECK, *Primary Examiner.*

U.S. Cl. X.R.

161—172; 264—176, 184